FIP8003 OR RE 6,647

J. OLIVER.

Chills for Casting Mold-Boards.

No. 6,647. Reissued Sept. 14, 1875.

Fig. 1.

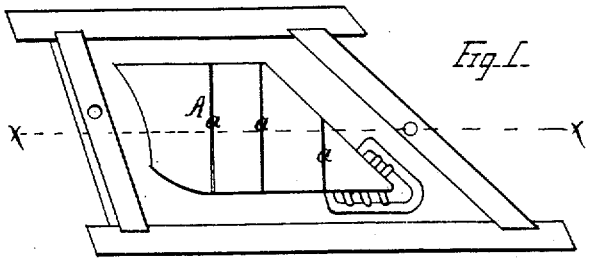

Fig. 2.

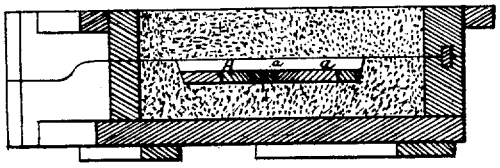

Fig. 3.

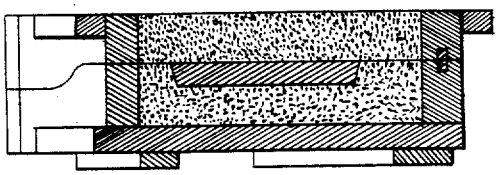

6,647. CHILLS FOR CASTING MOLD-BOARDS. James Oliver, South Bend, Ind. Patent No. 86,579, dated Feb. 2, 1869; reissue No. 5,321, dated Mar. 11, 1873. [Filed Sept. 6, 1875.]

A chill for casting mold-boards for plows, constructed to conform to the shape of the mold-board, and provided with unobstructed seams or openings of sufficient width to allow the escape of gas or steam while they prevent the entrance of molten metal therein when it is poured upon the chill, substantially as described.

WITNESSES
E. J. Rottingham
Wm. H. Brereton Jr.

INVENTOR
James Oliver.

By Leggett & Leggett Attorneys.

N. PETERS, PHOTO-LITHOGRAPHER, WASHINGTON, D. C.

UNITED STATES PATENT OFFICE.

JAMES OLIVER, OF SOUTH BEND, INDIANA.

IMPROVEMENT IN CHILLS FOR CASTING MOLD-BOARDS.

Specification forming part of Letters Patent No. 86,579, dated February 2, 1869; reissue No. 5,321, dated March 11, 1873; reissue No. 6,647, dated September 14, 1875; application filed September 6, 1875.

*To all whom it may concern:*

Be it known that I, JAMES OLIVER, of South Bend, county of St. Joseph and State of Indiana, have made certain new and useful Improvements in Chills for Casting Mold-Boards; and declare the following to be such a full, clear, and exact description thereof as will enable others skilled in the art to which my invention relates to make and use it, reference being had to the accompanying drawing, which forms a part of this specification.

The nature of my invention consists of a chill for casting mold-boards for plows, constructed to conform to the shape of the mold-board, and provided with seams or openings to allow the escape of steam and gas, as will be hereinafter more fully set forth.

In order to enable others skilled in the art to which my invention appertains to make and use the same, I will now proceed to describe its construction and operation, referring to the annexed drawing, in which—

Figure 1 is a plan of the chill and lower portion of the mold. Fig. 2 is a vertical section of the same, taken on the line *x x*, Fig. 1; and Fig. 3 is a vertical section of the mold and pattern.

Heretofore there has been considerable difficulty in the perfect and equal chilling of mold-boards, by a lack of opportunity for the escape of steam and gas which collects on the surface between the molten metal and the chill, thereby causing a part to be imperfectly chilled. To overcome this difficulty I form in the chill A a series of seams or openings, *a a*, which may be of any suitable width, only so that they will allow the steam and gas to escape, and thus allow all of the molten metal to come in contact with the chill. The chill A is made from suitable patterns, so as to conform exactly to the shape of the mold-board to be cast and chilled, and thus produce a chilled mold-board of the precise shape and form desired.

The mold-board and chill pattern are united in one, and it is molded in the usual manner. The pattern is then removed, and, having the chill hot, it is placed in its proper place and molten metal poured in. The chill is made in sections placed side by side, forming thus the seams or openings *a a*, which prevents warping the mold-board, as is often the case when the hot iron strikes one part of a full-sized chill, and should any one of the sections be injured by contact with the melted iron it can be replaced at a much less expense than a whole chill.

The object in uniting the chill-patterns and the patterns of the mold-boards is merely that in damp weather I can warm the chills and drop them in the places left by their impression.

Having thus described my invention, what I claim as new, and desire to secure by Letters Patent, is—

A chill for casting mold-boards for plows, constructed to conform to the shape of the mold-board, and provided with unobstructed seams or openings of sufficient width to allow the escape of gas or steam while they prevent the entrance of molten metal therein when it is poured upon the chill, substantially as described.

JAMES OLIVER.

Witnesses:
F. R. TUTT,
GEO. W. CROOKS.